(12) United States Patent
Fischer

(10) Patent No.: US 7,898,504 B2
(45) Date of Patent: Mar. 1, 2011

(54) PERSONAL THEATER DISPLAY

(75) Inventor: Ronald Fischer, Hollywood, CA (US)

(73) Assignees: Sony Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 998 days.

(21) Appl. No.: 11/697,633

(22) Filed: Apr. 6, 2007

(65) Prior Publication Data

US 2008/0246694 A1 Oct. 9, 2008

(51) Int. Cl.
*G09G 5/00* (2006.01)

(52) U.S. Cl. .......................... 345/9; 345/641; 715/798; 359/630

(58) Field of Classification Search .......... 345/7, 345/8, 9, 40, 641; 348/51, 96, 208.4; 715/764, 715/790, 798; 359/630; 257/59, 146
See application file for complete search history.

(56) References Cited

U.S. PATENT DOCUMENTS

| | | | |
|---|---|---|---|
| 5,815,126 A * | 9/1998 | Fan et al. | 345/8 |
| 5,991,085 A | 11/1999 | Rallison et al. | |
| 6,037,914 A * | 3/2000 | Robinson | 345/7 |
| 6,552,697 B1 * | 4/2003 | Oluta | 345/7 |
| 6,734,866 B1 * | 5/2004 | Dotson | 345/546 |
| 6,945,869 B2 | 9/2005 | Kim et al. | |
| 7,126,558 B1 | 10/2006 | Dempski | |
| 7,215,322 B2 * | 5/2007 | Genc et al. | 345/157 |
| 7,478,904 B2 * | 1/2009 | Oliver, III | 351/45 |
| 2006/0098293 A1 | 5/2006 | Garoutte et al. | |
| 2006/0181482 A1 | 8/2006 | Iaquinto | |

FOREIGN PATENT DOCUMENTS

| | | |
|---|---|---|
| WO | WO9946626 | 9/1999 |
| WO | WO06012679 | 2/2006 |

OTHER PUBLICATIONS

Daniel Thalmann, "Augmented Reality", http://vrlab.epfl.ch/~thalmann/VR/VRcourse_AR.pdf.
"Wearable 3D Augmented Reality Displays Go High Resolution", http://www.gizmag.com/go/3173/.
Steven Feiner et al., "The Touring Machine", http://www1.cs.columbia.edu/graphics/projects/mars/touring.html.
"Wearable 3D Augmented Reality Displays Go High Resolution", http://www.gizmag.com/go/3173/, Jun. 2004.
Steven Feiner et al., "The Touring Machine", http://www1.cs.columbia.edu/graphics/projects/mars/touring.html, Oct. 1997.
Azuma, R. "A Survey of Augmented Reality", Presence: Teleoperators and Virtual Environments. Aug. 1997, vol. 6.
Azuma, R. et al., "Recent Advances in Augmented Reality", IEEE Computer Graphics and applications, Nov. 2001, vol. 21, No. 6, pp. 34-47.
International Search Report issued in PCT/US2008/059497 on Jul. 31, 2008.

* cited by examiner

*Primary Examiner*—Abbas I Abdulselam
(74) *Attorney, Agent, or Firm*—Procopio, Cory, Hargreaves & Savitch LLP

(57) ABSTRACT

A system for combining an overlay image with externally-displayed visual content, the system including: a tracking module to receive alignment information; an image generator module to generate the overlay image, and to align the overlay image using the alignment information; and a personal display module to superimpose the overlay image over a view of the externally-displayed visual content.

36 Claims, 12 Drawing Sheets

PERSONAL THEATER DISPLAY

BACKGROUND

The present invention relates generally to interactive visual displays, and more particularly to methods and systems for overlaying generated images on a view of externally displayed visual content.

Theater patrons typically view movies on large two-dimensional projection screens. Technological advances over many years have resulted in improvements to visual and audio quality. Methods for effecting a three-dimensional ("3-D") view have also been developed, usually requiring moviegoers to view the main screen through a specially polarized or color-filtering film in discardable eyeglasses. However, in its essentials, the modern movie-going experience remains largely unchanged. The moviegoer passively views a movie projected conventionally onto a large two-dimensional main screen, with no means to enhance the experience by interacting with the displayed visual content.

Therefore, what is needed is a system and method that overcomes these and other deficiencies of the conventional movie-going experience as described above.

SUMMARY

The present invention provides methods and systems for superimposing generated images upon a view of externally-displayed visual content.

In one implementation, a system for combining an overlay image with externally-displayed visual content includes a tracking module to receive alignment information, an image generator module to generate the overlay image and to align the overlay image using the alignment information, and a personal display module to superimpose the overlay image over a view of the externally-displayed visual content.

In another implementation, a method for combining an overlay image with externally-displayed visual content includes receiving alignment information, aligning the overlay image using the alignment information, and superimposing the overlay image over a view of the externally-displayed visual content.

In another implementation, aligning the overlay image includes stabilizing the overlay image using orientation information, warping the overlay image to conform to a visual perspective of the view of the externally-displayed visual content, and registering the overlay image with the view of the externally-displayed visual content, including placing the overlay image at a position in a virtual foreground with respect to the view of said externally-displayed visual content, where the position varies with respect to the externally-displayed visual content according to a predetermined motion parallax.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings in which.

DETAILED DESCRIPTION

Figure 1A:
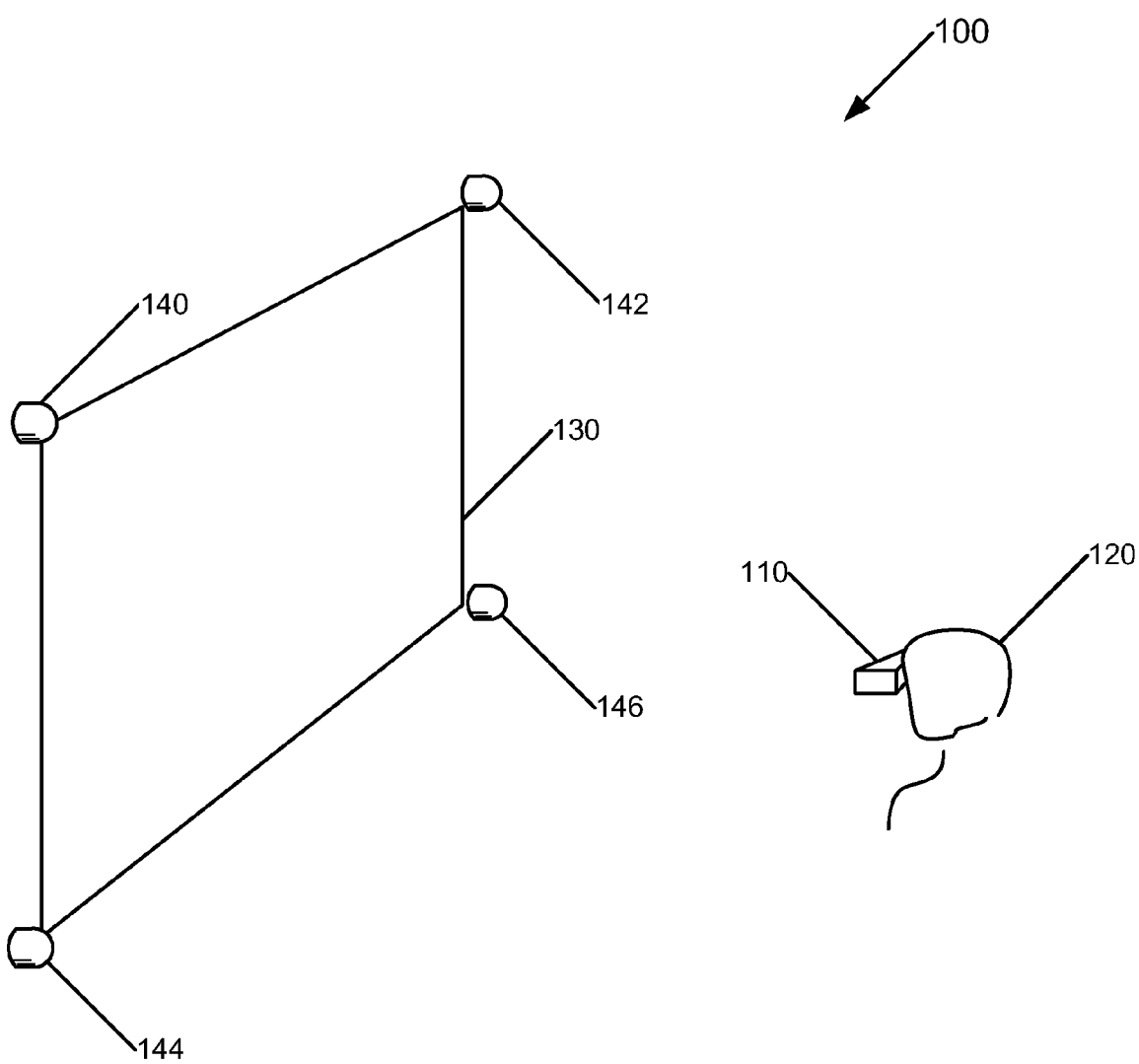
FIG. 1A illustrates a system for viewing displayed visual content with a personal theater display.

Certain implementations as disclosed herein provide for a richer movie theater experience by using a personal theater display. Overlay images are oriented and synchronized with, and superimposed on, a view of visual content (e.g., a movie and/or rendered graphics) while the visual content is displayed on an external main screen. The overlay images are generated at an external device in communication with the personal theater display placed in front of the viewer's eyes. The overlay images are transmitted to the personal theater display and combined with the visual content observed in the look-through view of the main screen. The overlay images may be stored at any time in the form of images and/or in the form of 3-D scene rendering data. The overlay images are also temporally synchronized with the content viewed on the main screen. Using a tracking device included with the personal theater display, the overlay images are also stabilized with respect to the main screen. Movements by the user that shift the view in the personal theater display, and perceived distortions of the view of the main screen (e.g., "keystoning") are thus accommodated. The overlay images are registered (i.e., positionally aligned) with the visual content viewed on the main screen to maintain the desired effect for the user, where the images are experienced as being integrated with the observed visual content.

For example, a system for combining an overlay image with externally-displayed visual content as disclosed herein provides for a tracking module to receive alignment information, an image generator module to generate the overlay image, and to align the overlay image using the alignment information, and a personal display module to superimpose the overlay image over a view of the externally-displayed visual content. In one implementation, a controllable aspect of the integrated view includes one or more cursors with which the user can interact with various objects in the viewed scene. In another implementation, the overlay image is perceived in a virtual foreground of the view and behaves according to motion parallax with respect to the visual content perceived in the background.

In yet another implementation, the overlay images include advertising or product placements. For example, advertising can be localized to make it relevant to a particular audience by using the overlay image to change the language on the view of the product placed in the visual content. This type of overlay images can also be used to change the language of the writing on the visual content.

After reading this description it will become apparent to one skilled in the art how to implement the invention in various alternative implementations and alternative applications. However, although various implementations of the present invention will be described herein, it is understood that these implementations are presented by way of example only, and not limitation. As such, this detailed description of various alternative implementations should not be construed to limit the scope or breadth of the present invention as set forth in the appended claims.

FIG. 1A illustrates an example system 100. A user 120 observes an external viewable area 130 through a personal theater display 110. Markers 140, 142, 144, 146 provide alignment information that is used by the personal theater display 110 for aligning, including stabilizing, registering, and synchronizing, overlay images displayed by the personal theater display 110 and superimposed on the user's view of the external viewable area 130.

In one implementation, the external viewable area 130 is a movie screen located in a movie theater. Visual content is typically projected onto such a viewable area 130 with a projector located behind the user 120. Other types of viewable areas 130 may also be used, including rear-projection screens, flat-panel displays such as plasma and LCD displays, and CRT displays, as well as other non-flat display types including OMNIMAX™, Circlevision™ and Cinerama™.

The visual content displayed in the viewable area 130 is observable by looking through the personal theater display 110. The personal theater display 110 receives overlay images, stabilizes the overlay images with respect to the viewable area 130, superimposes the overlay images upon the observed view in synchronization with the visual content displayed on the viewable area 130, and registers the overlay images with the visual content. One desired effect for the user 120 is to experience the overlay images as an integrated part of the visual content observed on the viewable area 130. Further, the overlay images can be superimposed apart from the visual content, or adjoining its outer boundaries. Thus, the user's view can be virtually extended beyond the viewable area 130. It will be appreciated that image registration at the boundaries of the visual content can entail specialized techniques to account for lens edge distortions.

As mentioned, the markers 140, 142, 144, 146 provide alignment information with which the overlay images are stabilized, registered, and synchronized. Stabilization is required to accommodate movements of the user's 120 head. For example, if the user's 120 gaze is shifted to the left by turning the head in that direction, the observed view of the viewable area 130 translates to the right. The overlay images in the user's 120 view must therefore also translate to the right by an appropriate amount to remain properly positioned with respect to the viewable area 130 and displayed visual content.

Stabilization further accommodates distortions in the user's view of the viewable area 130 due to the position of the user 120 relative to the viewable area 130. When the user 120 is positioned so that his or her view is perpendicular to the center of the viewable area 130, substantially no distortion in the view is perceived. However, when the user 120 is positioned to the left of center with respect to the viewable area 130, for example, the perceived view of the viewable area 130 and the visual content displayed thereon will be subject to a so-called "keystoning" effect, wherein the leftmost end of the viewable area 130 appears larger than the more distant rightmost end. For a user 120 thus positioned, the overlay images must be "warped" accordingly to conform to the keystone distortion in the view of the viewable area 130 before it can be superimposed. The amount and nature of any keystoning effect can be derived from a view of the markers 140, 142, 144, 146 captured by the personal theater display 110 from the user's 120 viewing position with respect to the markers 140, 142, 144, 146.

In one implementation, the markers 140, 142, 144, 146 are infra-red ("IR") emitters. Because light in the IR range is not visible to humans, but is readily detectable by optical sensors, it makes a suitable choice for use in a movie theater as it will not interfere visually with a user's 120 enjoyment of a movie. The markers 140, 142, 144, 146 can be positioned about the viewable area 130 such that they are included in the view through the personal theater display 110, and can thus be optically captured along with the visual content and detected therein. The markers 140, 142, 144, 146 can further be made self-identifying by configuring them to pulse at unique frequencies, by configuring them to emit IR light in different sub-bands of the IR spectrum, or by positioning them in a predetermined pattern. Self-identification is explained in more detail below. In other implementations, markers are implemented using other types of passive and/or active devices detectable by appropriate tracking sensors included in the personal theater display 110.

In another implementation, stabilization can be simplified by configuring the personal theater display 110 to include predefined information as to the location of the user 120 in relation to the viewable area 130. Using the example of a user 120 in a movie theater, the predefined information can be the seat number of the seat in which the user 120 is sitting, and a map with which to relate the seat number with the viewable area 130 (i.e., movie screen). Accordingly, using predefined information as described, stabilization may be simplified, with increased accuracy, speed, and reduced implementation costs.

Image registration is a process by which the content of one image is positionally arranged with the content of another. Accordingly, in one implementation, the overlay images are registered with the visual content that is observed by the user 120 through the personal theater display 110. The manner in which the markers 140, 142, 144, 146 may operate in image stabilization and registration will be explained in more detail below.

In one implementation, the overlay images are registered to induce a perception by the user 120 that it is positioned in a virtual foreground with respect to the visual content, which is perceived in the background. The overlay image registered as described above may represent an object blocking the view to the user 120 of another object of interest in the background. The user 120 can then shift the position of the user's head to one side in a natural movement to look around the perceived foreground object. The movement is tracked by the personal theater display 110, and a motion parallax effect is imposed on the overlay images, causing it to move to one side as if the user 120 were looking around it.

Synchronization of the overlay images with the visual content is necessary. Lacking temporal alignment, the overlay images would generally not be properly perceived by the user 120 as integrated with the visual content. In one implementation, timing information is displayed on the viewable area 130 along with the visual content. For example, such information can be displayed imperceptibly in specified frames of visual content. In another implementation, timing information can be transmitted via the markers 140, 142, 144, 146. Visual content displayed on the viewable area 130, and overlay images displayed by the personal theater display 110 therefore have the same frame time, so that actions shown in both occur at the same time.

Figure 1B:
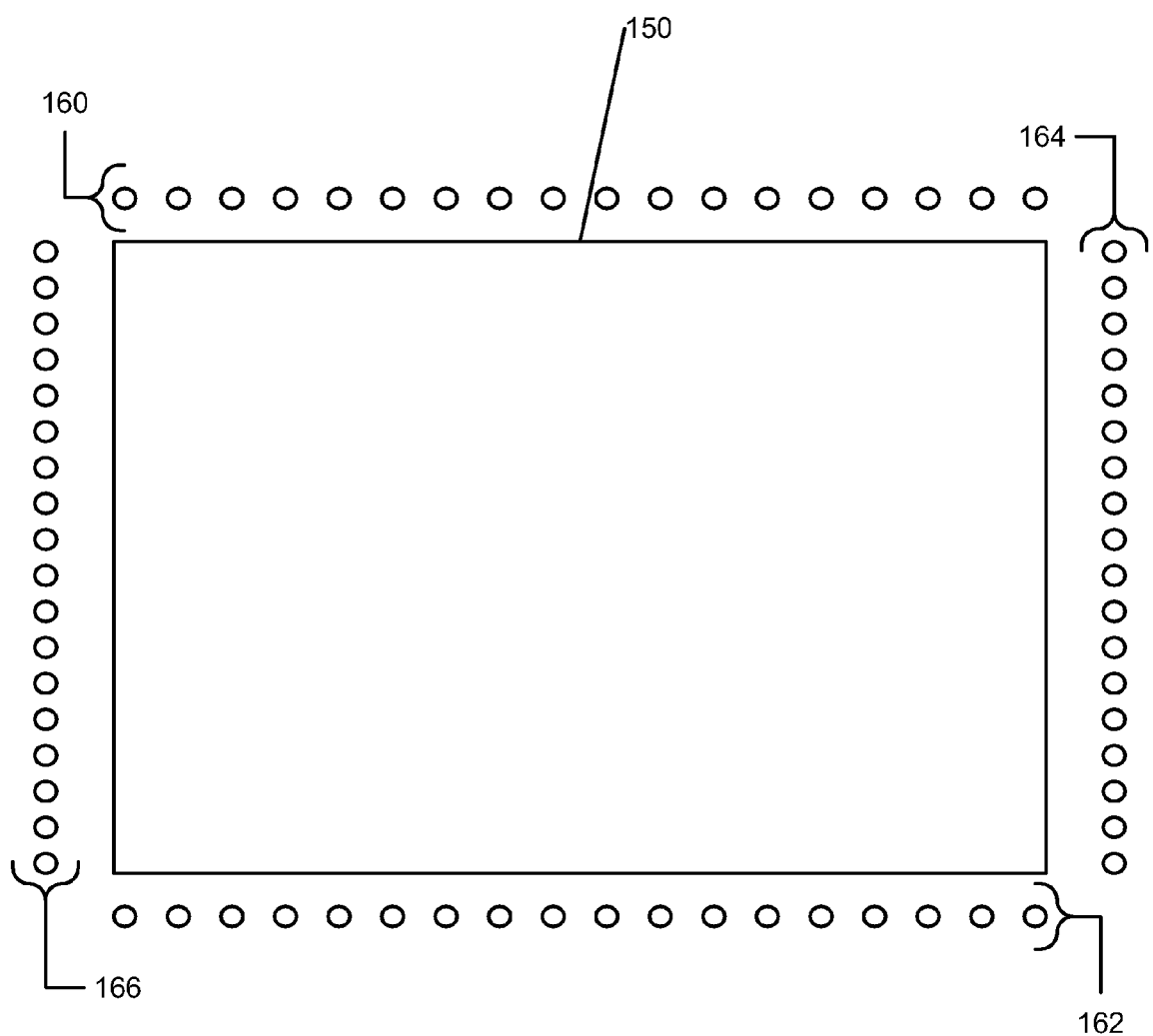
FIG. 1B depicts an example movie screen with an arrangement of markers.

FIG. 1B depicts an example viewable area 130 represented by a movie screen 150, with a plurality of markers disposed along its sides. The markers are disposed in marker rows 160, 162 and marker columns 164, 166.

As depicted, the marker rows and columns 160, 162, 164, 166 frame the movie screen 150. A user 120 wearing a personal theater display 110 can then view any portion of the movie screen 150 and also view simultaneously at least one marker row 160, 162 and one marker column 164, 166. From the at least one marker row 160, 162 and one marker column 164, 166, adequate alignment information can be received to perform orientation and synchronization of the overlay images with respect to the visual content displayed on the screen 150.

In one implementation, the marker rows and columns 160, 162, 164, 166 include active LED markers capable of emitting pulses of infra-red light in predetermined patterns. The marker rows and columns 160, 162, 164, 166 can be configured to encode various types of alignment information, such as temporal alignment (timing/synchronization) information using a binary code. For example, there are 18 markers in each of the marker rows and columns 160, 162, 164, 166 depicted in FIG. 6B. Each row 160, 162 and column 164, 166 can therefore encode an 18-bit binary string using ON/OFF states for each marker. Thus, any integer from 0 to $2^{18}$-1 can be encoded, which can be used to uniquely timestamp each frame of a motion picture of a typical two-hour length, displayed at 24 frames per second. Encoded timing information can thus be transmitted, decoded, and used to synchronize overlay images with the visual content displayed on the screen 150. It will be appreciated that other types of information encoding are similarly possible using an arrangement of markers disposed on or near the screen 150.

Figure 1C:
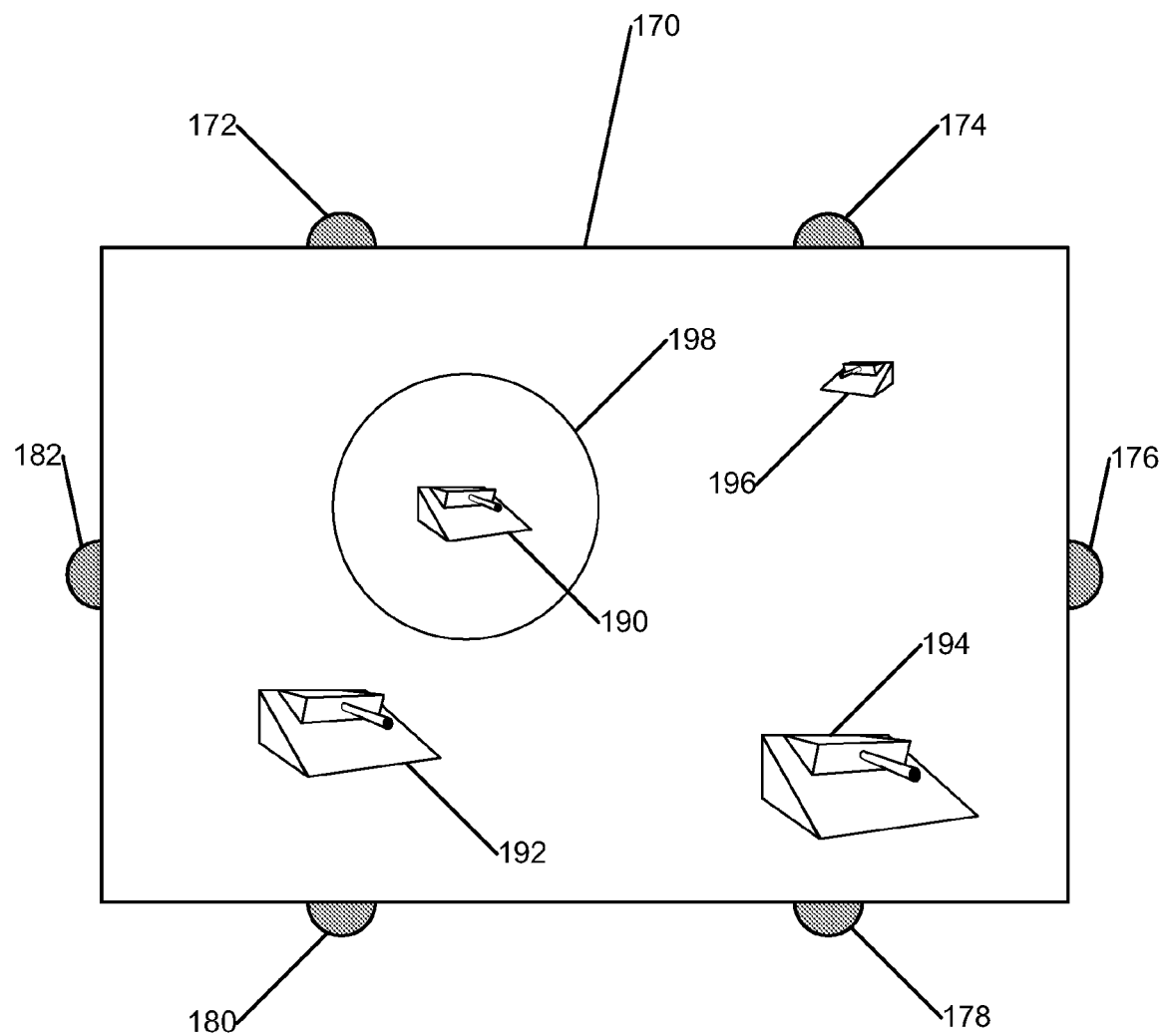
FIG. 1C depicts an example movie screen with an arrangement of visible calibration markers, and a display of content elements.

FIG. 1C depicts an example viewable area 170. Also shown is an arrangement of visible calibration markers 172, 174, 176, 178, 180, 182 and a display of content elements 190, 192, 194, 196, and a highlighter 198.

In one implementation, the viewable area 170 is a movie screen. The visible calibration markers 172, 174, 176, 178, 180, 182 are detected by the personal theater display 110 and used to perform an initial calibration for stabilization. For example, a user 120 can use the visible calibration markers 172, 174, 176, 178, 180, 182 to manually align the personal theater display 110 to the viewable area using a user interface 240 to select the visible calibration markers 172, 174, 176, 178, 180, 182 with a cursor. (A user interface and cursor are discussed in more detail below.) In another implementation, the personal theater display 110 can perform an automatic calibration using the visible calibration markers 172, 174, 176, 178, 180, 182.

As discussed in the foregoing in relation to FIG. 1A, predefined information can be provided to the personal theater display 110, such as the user's 120 seat number, and used to simplify calibration. Thus, only a fine, "local" level of calibration would remain to be determined, leading to quicker system response and reduced implementation costs.

Figure 1D:
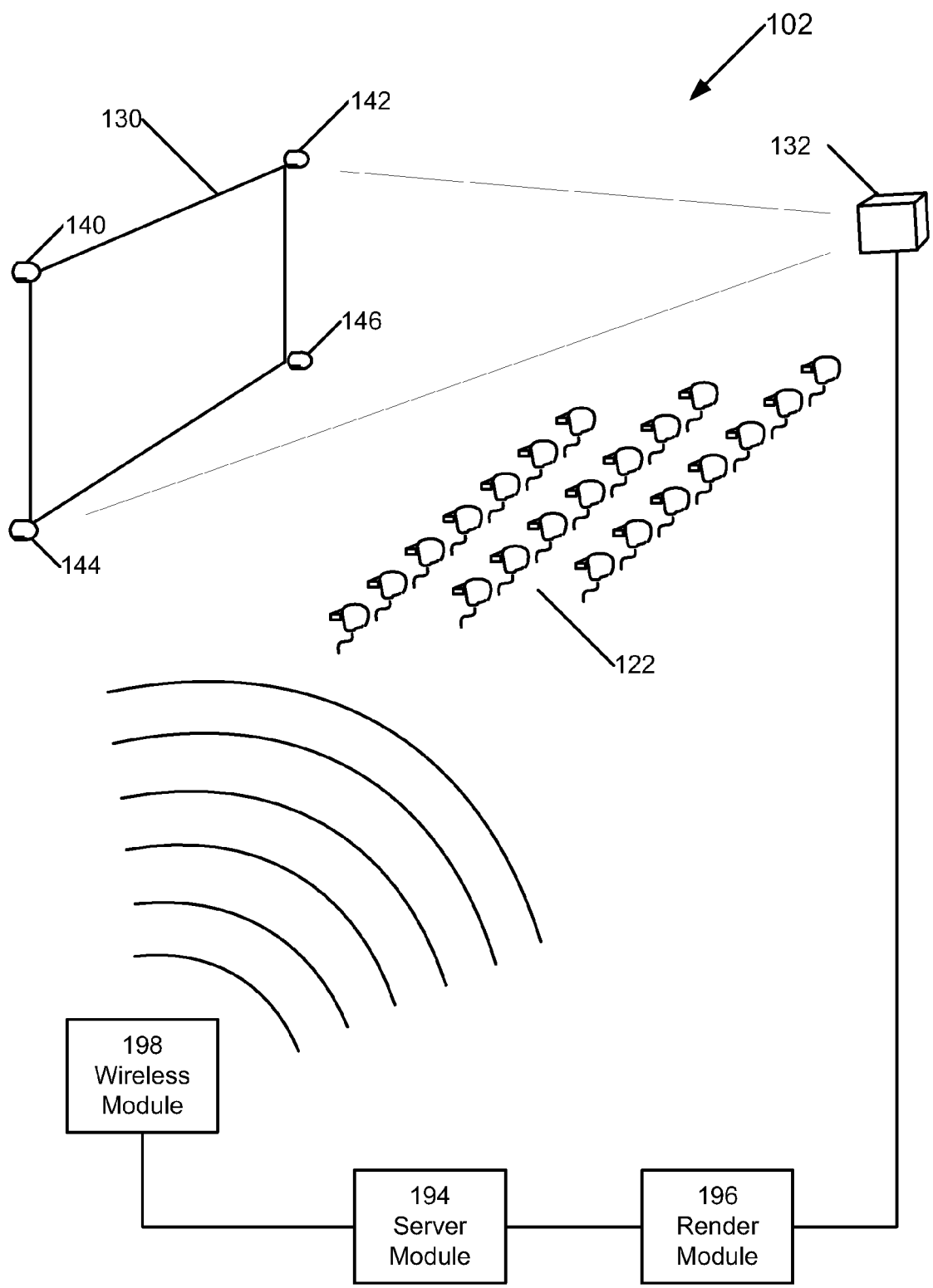
FIG. 1D depicts a system for viewing displayed visual content with a personal display, including wireless transmission of overlay images.

FIG. 1D depicts a system 102 for viewing displayed visual content with a personal theater display 120. The system 102 includes a movie screen 130, markers 140, 142, 144, 146, an audience 122 (wherein each user 120 in the audience 122 is equipped with a personal theater display 110), at least one projector 132, a server module 194, a render module 196, and a wireless module 198. 3-D graphics data are generated at the server 194. The render module 196 receives 3-D graphics data for projection from the server 194 and can render in real-time visual content defined by the 3-D graphics data for projection. The visual content is transmitted to a projector 132, which in turn projects the visual content onto the movie screen 130.

3-D graphics data for overlay images are received from the server 194 by a wireless module 198. The wireless module 198 is wirelessly connected to at least one of the personal theater displays 110 worn by the users 120 comprising the audience 122. The wireless module 198 transmits wirelessly the 3-D graphics data for overlay images to at least one of the personal theater displays 110. The 3-D graphics data for overlay images are received by one or more of the personal theater displays 110 and rendered for viewing in the personal theater display 110.

In one implementation, the personal theater display 110 is coupled to a controller 230, 330 as discussed below in relation to FIGS. 2 and 3. The wireless module 198 has a wireless connection with the controller 230, 330, and transmits in real-time the 3-D graphics data for overlay images. The 3-D graphics data for overlay images are rendered at the controller 230, 330 or the personal theater display 110 for viewing at the personal theater display 110.

In one implementation, as discussed in relation to FIG. 1A, the markers 140, 142, 144, 146 provide alignment information with which the overlay images are stabilized, registered, and synchronized at each personal theater display 110 worn by users 120 of the audience 122.

Figure 2:
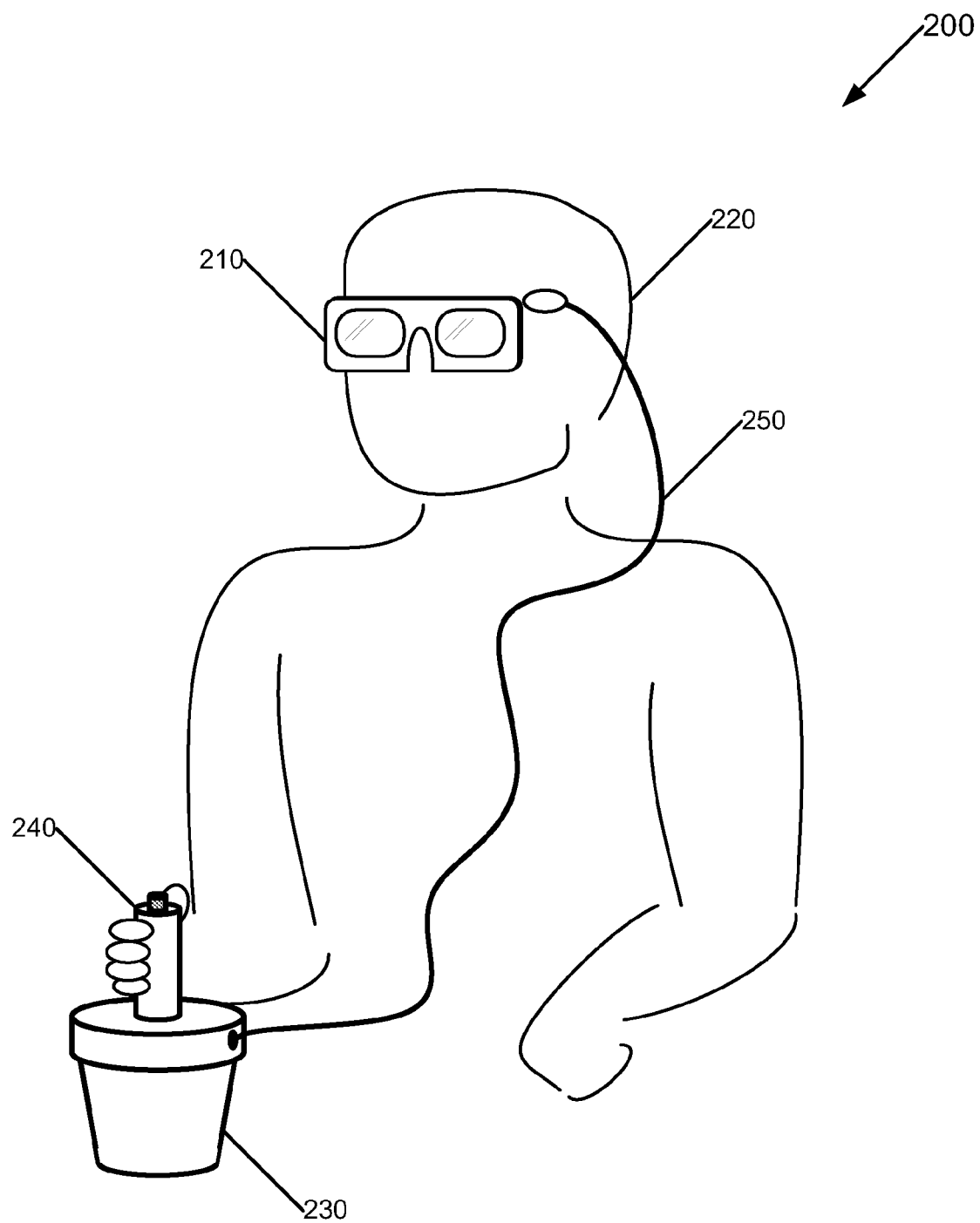
FIG. 2 illustrates an example personal theater display and controller with a user interface.

FIG. 2 illustrates an example personal theater system 200. As depicted, the system 200 includes a personal theater display 210, a controller 230 having a joystick 240, and a connecting cable 250.

A user 220 is equipped with a personal theater display 210. In the illustrated implementation of FIG. 2, the personal theater display 210 is configured in a binocular arrangement, self-supported in front of the eyes of the user 220. In another implementation, the personal theater display 210 is handheld. The controller 230 as shown may be held by the user 220, or supported, for example, in the user's lap or by an armrest. The controller 230 includes image generating functionality, and provides the overlay images used by the personal theater display 210. The controller 230 includes a user interface, depicted in FIG. 2 as a joystick/button combination 240. While a joystick/button combination 240 is shown, the user interface can also be implemented as, for example, a track pad, trackball, or a keypad.

In one implementation, the personal theater display 210 includes audio transducers (not shown) providing audio content for the user 220. The audio transducers may be implemented, for example, as earphones connected to the personal theater display 210 or to the controller 230, as one or more earpieces coupled to the personal theater display 210, or as one or more speakers coupled to the personal theater display 210.

In one implementation, the joystick 240 is used to control the position of a cursor displayed to the user 220 in the personal theater display 210. The cursor is overlaid as part of the overlay images on the visual content, and is used to select various objects and points of interaction in the scene.

The controller 230 is coupled to the personal theater display 210 with a connecting cable 250. The connecting cable 250 provides for communication between the controller 230 and the personal theater display 210, such as that necessary to transmit overlay images for superimposition in the personal theater display 210. Stabilization, registration, and synchronization information are also transmitted over the connecting cable 250 to the controller 230. In a commercial mass-use application, such as a movie theater, the connecting cable 250 further serves to physically link the personal theater display 210 and the controller 230, allowing the two components to be treated as a single unit, thus simplifying handling requirements.

In one implementation, the connecting cable 250 is a High Definition Multimedia Interface (HDMI) cable for digitally transmitting audio and visual information from the controller 230 to the personal theater display 210.

In another implementation, the communications functionality of the connecting cable 250 is replaced by a wireless connection between the controller 230 and the personal theater display 210. It will be appreciated that there are many possibilities as to the type of wireless connection that can be used, including Bluetooth and Wi-Fi.

Figure 3:
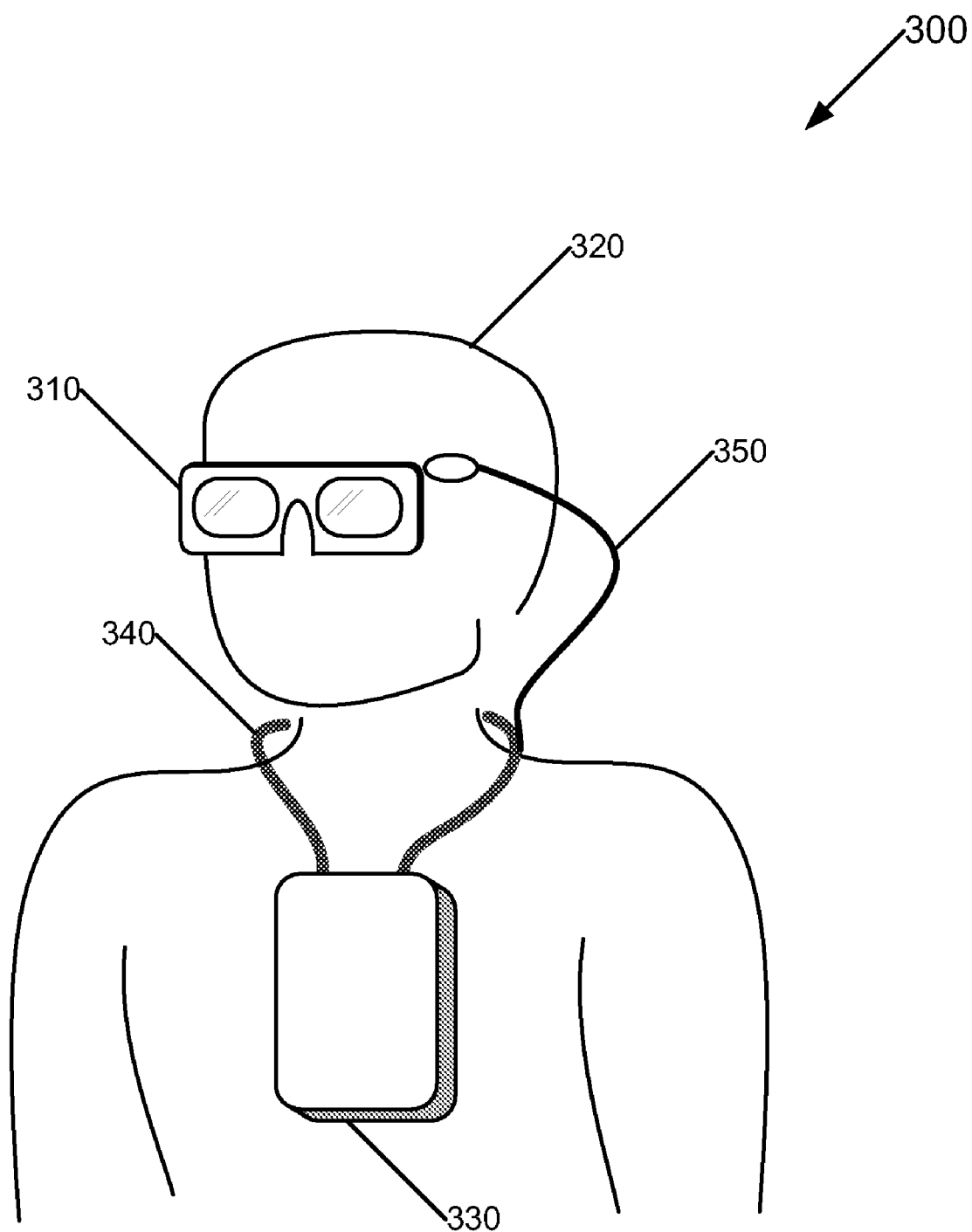
FIG. 3 illustrates another example of a personal theater display and controller.

FIG. 3 illustrates another example personal theater system 300. As shown, the system 300 includes a personal theater display 310, an image generator 330, a lanyard 340, and a connecting cable 350.

A user 320 is equipped with a personal theater display 310. In the illustrated implementation of FIG. 3, the personal theater display 310 is configured in a binocular arrangement self-supported in front of the eyes of the user 320. Other implementations may include a hand-held version, and a version supported independently of the user's 320 face or body. The image generator 330 as shown is supported by a lanyard 340 placed around the neck of the user 320. The image generator 330 provides the overlay images used by the personal theater display 310.

The image generator 330 can be coupled to the personal theater display 310 with a connecting cable 350. The connecting cable 350 provides for communication between the image generator 330 and the personal theater display 310 necessary to transmit images to the personal theater display 310, and stabilization, registration, and synchronization information to the image generator 330. In a commercial mass-use application, such as a movie theater, the lanyard 340 and connecting cable 350 also serve to physically link the personal theater display 310 and the image generator 330, allowing the two components to be treated as one, thus simplifying handling requirements. In another implementation, the communications functionality of the connecting cable 350 is replaced by a wireless connection between the image generator 330 and the personal theater display 310. It will be appreciated that there are many possibilities as to the type of wireless connection that can be used, including Bluetooth and Wi-Fi.

Figure 4:
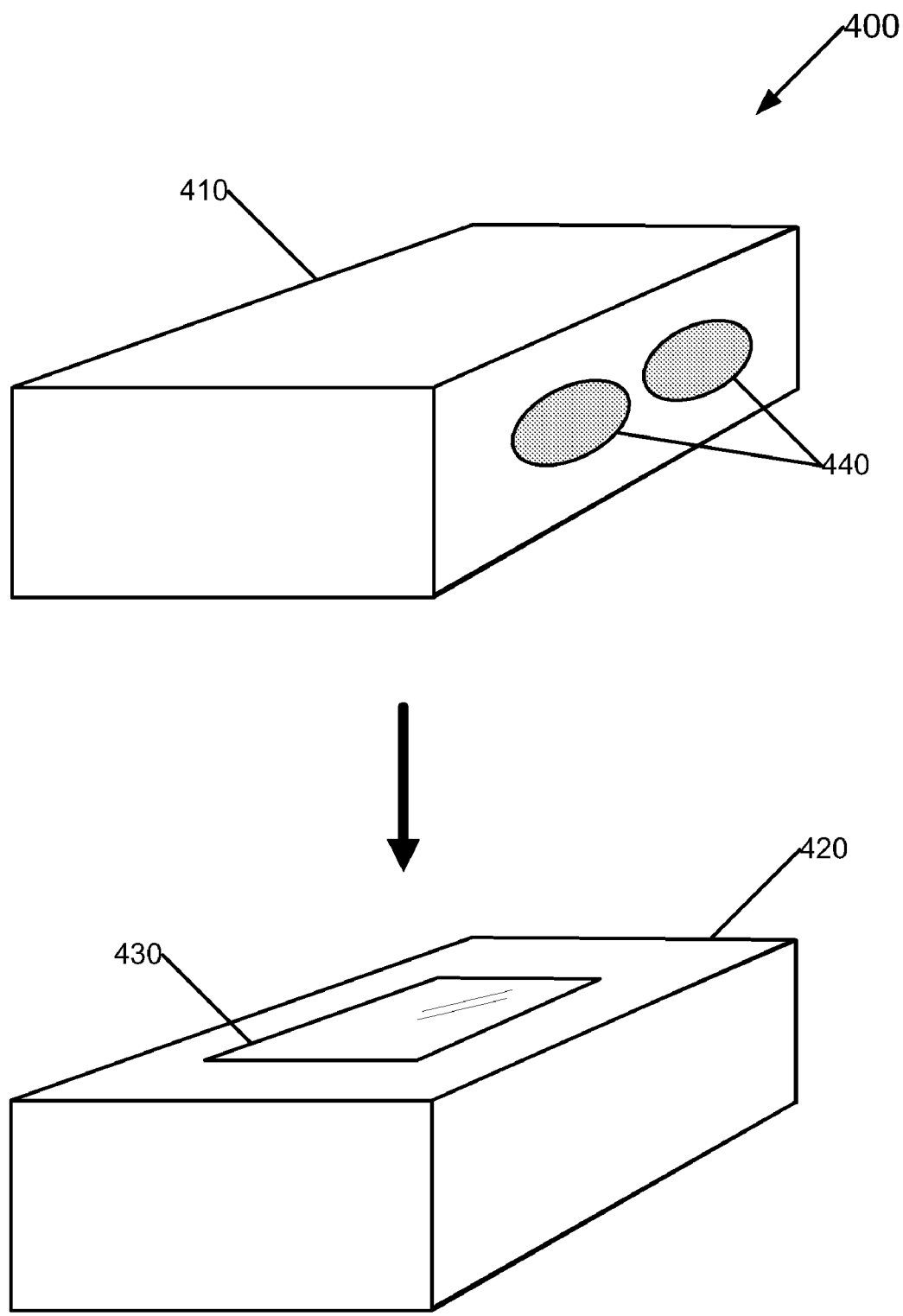
FIG. 4 illustrates an example of a coupled personal theater display with an image generator.

FIG. 4 illustrates another example of a personal theater display system 400. The system 400 depicted includes a personal theater display 410 and an image generator 420.

The personal theater display 410 includes two viewing apertures 440, through which a user 120 observes visual content displayed on a viewable area 130, as shown in FIG. 1A. As discussed above, overlay images are received at the personal theater display 410 and superimposed on the observed visual content. In this implementation, the image generator 420 includes a display aperture 430 on its topside through which it displays the overlay images. The underside of the personal theater display 410 is coupled to the topside of the image generator 420 such that a matching aperture (not shown) on the underside aligns with the display aperture 430 on the topside of the image generator 420. The personal theater display 410 receives the overlay images displayed through the display aperture 430. The personal theater display 410 includes functionality to perform stabilization, registration, and synchronization with the overlay images. In one implementation, the overlay images displayed by the image generator 420 includes synchronization information for use by the personal theater display 410 in conjunction with timing information received with the visual content displayed on the viewable area 130. In one implementation, the image generator is configured to receive control inputs from the personal theater display 410 for synchronization of the images.

The image generator 420 may include many types of devices. In one implementation, the image generator 420 is a SONY Playstation® Portable (PSP®). In another implementation, the image generator 420 is an optical disk player capable of playing DVD, CD, Blu-Ray Disc®, and other optical storage types. The image generator 420 may also include magnetic storage media including hard drives, flash memory, and RAM.

Figure 5:
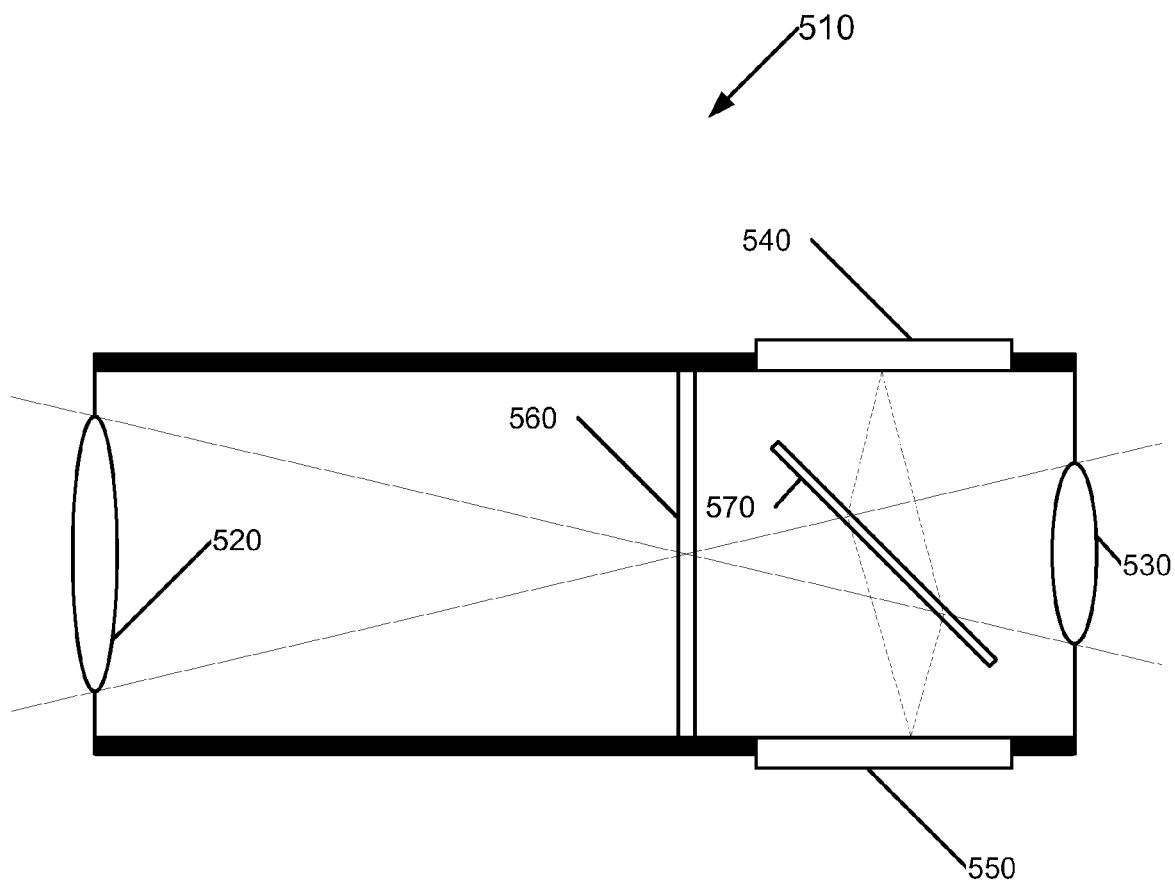
FIG. 5 illustrates an implementation of a personal theater display.

FIG. 5 illustrates an example implementation of a personal theater display 510. Shown are a receiving lens 520, a viewing lens 530, an internal display 540, a tracking imager 550, a pixel shutter 560, and an optical splitter 570.

Light rays comprising the observed view of a viewable area 130 (including visual content and marker 140, 142, 144, 146 emissions, for example) are received at the receiving lens 520. The light passes through the substantially open pixel shutter 560 and the optical splitter 570 to the viewing lens, where it is focused at the user's eye. Overlay images are received by the personal theater display 510 and displayed by the internal display 540. The internal display 540 directs the displayed images onto the optical splitter 570, where it is superimposed on the visual content received at the receiving lens 520. Hence, the user perceives the integration of the overlay images with the visual content at the viewing lens 530.

Alignment information including stabilization, registration, and timing information is also received through the receiving lens 520. In one implementation, the information is embodied in signals (e.g., light) generated by markers 140, 142, 144, 146, as shown in FIG. 1A. A signal passes through the pixel shutter 560 onto the optical splitter 570. The tracking imager 550, functioning similarly to a camera, captures the signal emitted by the markers 140, 142, 144, 146 as an image, from which stabilization, registration, and timing information can be derived. In one implementation, the markers 140, 142, 144, 146 are disposed in a predetermined physical pattern from which the relative orientation, including relative affine disposition, of the personal theater display 510 to the markers 140, 142, 144, 146 can be derived. For example, as depicted in FIG. 1A, the markers 140, 142, 144, 146 are disposed such that they describe a level rectangle bordering the screen 130. The imaging tracker 550 derives the positions of the markers 140, 142, 144, 146 captured through the receiving lens 520 to estimate the relative orientation of the personal theater display 510 to the level rectangle defined by the markers 140, 142, 144, 146, and therefore also its relative orientation to the screen 130. Also derivable are any keystoning effects due to the position of the personal theater display 510 with respect to the screen 130. The overlay images displayed by the internal display 540 can then be rotated, for example, to accommodate a roll in the user's view induced by a head movement, and warped to accommodate keystoning, thus stabilizing and orienting the images with the visual content displayed on the viewable area 130.

In another implementation, alignment information including stabilization, registration, and timing information, can also be received via a cable 350, such as is shown in FIG. 3. The overlay images displayed in the personal theater display 510 can then be adjusted as described above independently of the visual content and/or markers 140, 142, 144, 146. Alternatively, alignment information received via the cable 350 can be used in conjunction with alignment information received via visual content and/or markers 140, 142, 144, 146 at the receiving lens 520. Thus, a level of independent, local control can be imposed on each personal theater display 510 in use at a movie theater, for example, by providing alignment information via a cable.

The overlay images are registered with the observed visual content. In one implementation, the markers 140, 142, 144, 146 can function as anchor points defining a coordinate grid on the viewable area 130 for positioning (i.e., registering) the overlay images for superimposition over the visual content at a particular x-y position.

The markers 140, 142, 144, 146 can also be configured to be uniquely self-identifying, as discussed above in relation to FIG. 1A. Stabilization and registration are simplified when the relative orientation of the personal theater display 510 to the viewable area 130 is more readily determinable through the use of self-identifying markers 140, 142, 144, 146. For example, a marker 140 at the upper-left corner of a viewable area 130 can be uniquely identified by configuring it to pulse at a predetermined frequency. When captured at the tracking imager 550, the pulsed signal can be readily identified as coming from the marker 140. The other markers 142, 144, 146 can be similarly configured and identified.

The internal display 540 communicates with the pixel shutter 560 and provides control for masking out certain portions of the view received at the receiving lens 520. The portion of the view that is masked corresponds to the area in the view in which overlay images are superimposed. By masking that corresponding area, the superimposed images gets optimal visibility. Without masking, the overlay images can appear translucent, detracting from the visual experience desired for the user. In one implementation, when pixels of the internal display 540 are activated in the course of displaying an overlay image, corresponding pixels in the pixel shutter 560 are also activated to block that portion of the view received at the receiving lens 520.

In another implementation, the optical paths for right-left binocular viewing are folded into a single optical path. For example, the receiving lens 520 and viewing lens 530 each represent a pair of right-left lenses. The light received at the receiving lenses 520 is channeled into a single optical path which is processed using single instances each of the internal display 540, tracking imager 550, pixel shutter 560, and optical splitter 570. The resulting optical output is viewed at the viewing lenses 530. The reduced number of components and simplified construction consequently reduce the costs of product and maintenance. In another implementation, a separate instance of the components comprising the personal theater display 510 shown in FIG. 5 is provided for each of the right and left sides of a binocular viewing configuration.

Figure 6A:
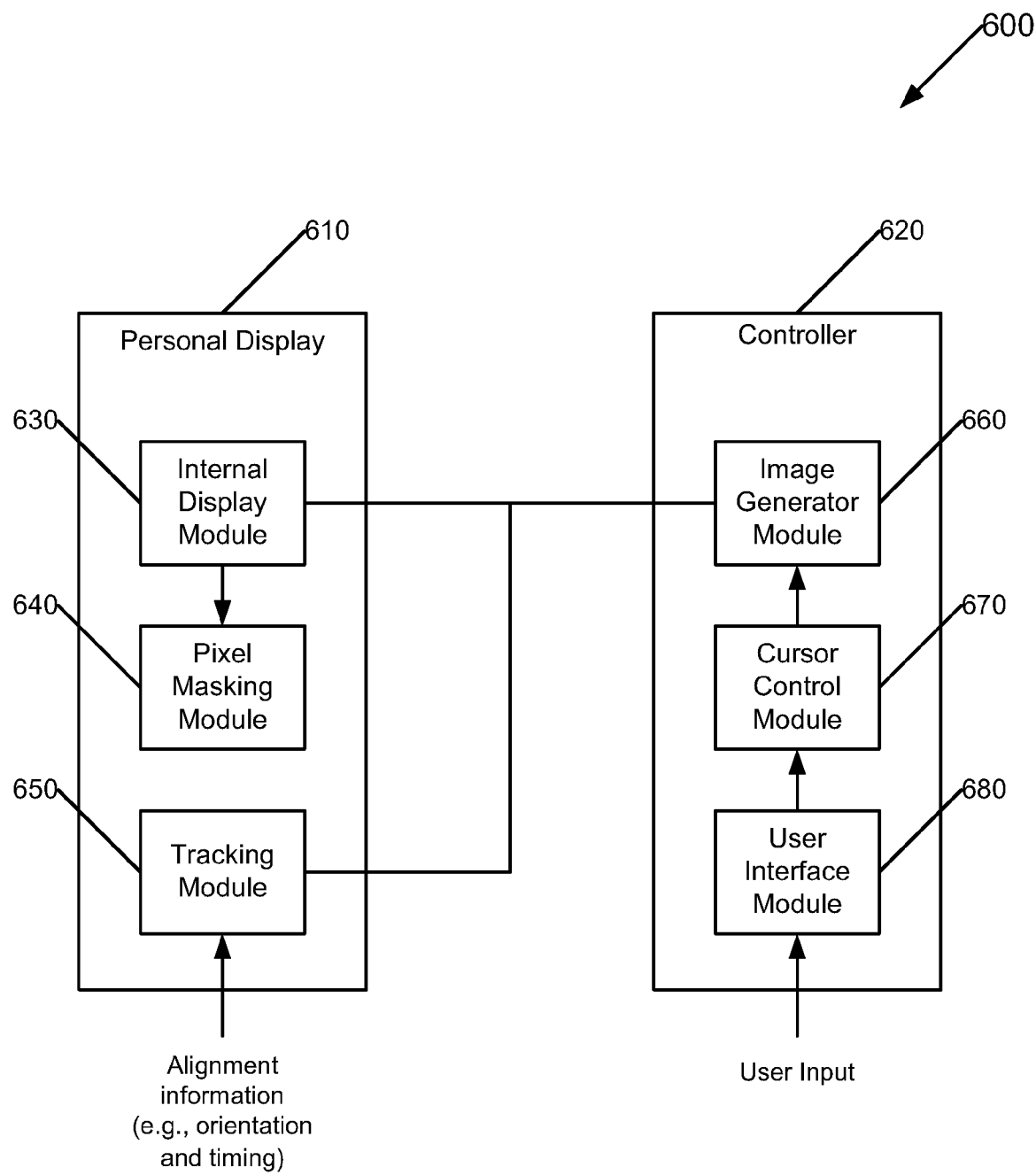
FIG. 6A is a functional block diagram of a personal theater display and controller.

FIG. 6A is a functional block diagram of a system 600 including a personal theater display module 610 coupled with a controller module 620. As shown, a personal theater display module 610 includes an internal display module 630, a pixel masking module 640, and a tracking module 650. The controller module 620 includes an image generator module 660, a cursor control module 670, and user interface module 680. The image generator module 660 is in communication with the internal display module 630 and the tracking module 650.

The personal theater display module 610 allows a user to observe visual content displayed on a viewable area 130, as discussed above in relation to FIG. 1A. The internal display module 630 manages the display of the overlay images, which is superimposed on the user's view of the visual content. In one implementation, the internal display module 630 receives the overlay images from the image generator module 660. As depicted in FIG. 2, the internal display module 630 can receive the images via a cable connection. Other means for receiving the images include, but are not limited to, wireless connections such as Bluetooth and Wi-Fi. Storage of the overlay image data can be managed by the image generator module 660 by means of magnetic media, such as a hard disk, RAM, or flash memory, or by means of optical storage, such as a CD, DVD, Blu-Ray Disc®, or other optical storage type. In one implementation, the image generator 630 can receive image data over a wired network, or a wireless network, from another images source.

The pixel masking module 640 is functionally coupled to the internal display module 630. As discussed above in relation to FIG. 5, to achieve a best visual effect it is desired to mask certain portions of the view corresponding to the area in the view over which overlay images will be superimposed. This ensures that the overlay images will not appear translucent and detract from the desired visual experience for the user. In one implementation, when pixels of the internal display module 630 are activated in the course of displaying an image, corresponding pixels of the pixel masking module 640 are simultaneously closed to block that portion of the view of the visual content, over which the overlay images are superimposed.

The tracking module 650 functions in part like a camera, capturing the received view, including alignment information comprising orientation and/or timing information. In one implementation, the alignment information includes IR emissions from the markers 140, 142, 144, 146. The captured view may be filtered for IR content, which may then be used to derive stabilization and registration information, as discussed above. Additionally, or alternatively, the markers 140, 142, 144, 146 may be configured for self-identification. They can, for example, be configured to pulse regularly at predetermined frequencies, or irregularly according to predetermined patterns. The pulse patterns of the markers 140, 142, 144, 146 may also encode alignment information including orientation and timing information. Further, the markers 140, 142, 144, 146 may be configured to emit IR light in different sub-bands of the IR spectrum as a way to effect ready discrimination.

Synchronization of the overlay images with the visual content is desired. The overlay images will not be properly perceived by the user 120 as an element of the visual content if it is not temporally aligned. In one implementation, timing information is displayed on the viewable area 130 along with the visual content. The timing information (e.g., a bar code) can be displayed imperceptibly within, or between, specified frames of visual content. In some cases, detecting a projection of a bar code displayed using IR light may require the use of an IR filter to prevent the IR light from being washed out by other light of the visual content. Displaying the bar code using IR light during the momentary darkness between frames is therefore advantageous because any wash-out effects are minimized. An image of the bar code is captured at the tracking module 650 and processed to extract the timing information. The timing information is then communicated to the image generator module 600, which uses it to synchronize the transmission and display of overlay images with the visual content. In one example, a time stamp associated with a particular frame of the visual content is extracted from the visual content stream captured at the tracking module 650. The time stamp is transmitted to the image generator module 660, which in turn transmits to the internal display module 630 an appropriate overlay image for synchronous superimposition with a frame of visual content. It will be appreciated that transmission and other system latencies which affect synchronization can be estimated and accommodated.

The use of a barcode is one example method for communicating timing information to the personal theater display module 610. Other methods of encoding an imperceptible timestamp in the visual content also exist. For example, a timestamp may be communicated using an alphanumeric value, or virtually any graphical, pictorial, or symbolic pattern configurable to embody timing information decodable at the tracking imager 650.

In another implementation, timing information can also, or alternatively, be transmitted via the markers 140, 142, 144, 146. For example, timing information can be encoded into a pulse pattern. Or, one or more of the markers 140, 142, 144, 146 may provide a steady synchronizing signal by pulsing at a frequency at some fraction, or multiple, of the frame rate of the visual content displayed on the viewing area 130. As discussed above in relation to FIG. 1B, timing information can be encoded using ON/OFF states of markers comprising marker rows and columns 160, 162, 164, 166 as depicted therein.

Overlay image data storage may be performed at either or both the personal theater display 610 or the controller 620. Further, the overlay image data may be stored in the form of images (e.g. using image decoding to obtain the actual image data), or as 3-D graphics data for rendering by a rendering algorithm.

In another implementation, one or more of the markers 140, 142, 144, 146 is configured for very high frequency pulsing with which visual content is encoded and transmitted to the personal theater display 110.

In another implementation, visual content projected onto the viewable area 130 includes all timing and alignment information by separating the timing information, alignment information, and content into distinct sub-bands of light. Filters are then used at the personal theater display 110 to separately capture the distinct sub-bands from which the information and content are extracted. In one example, separate 30 nm wide bands of IR light can be used for conveying timing and alignment information at 810 nm, and 840 nm. Specialized filters may then be used to capture the IR light in those bands.

Figure 6B:
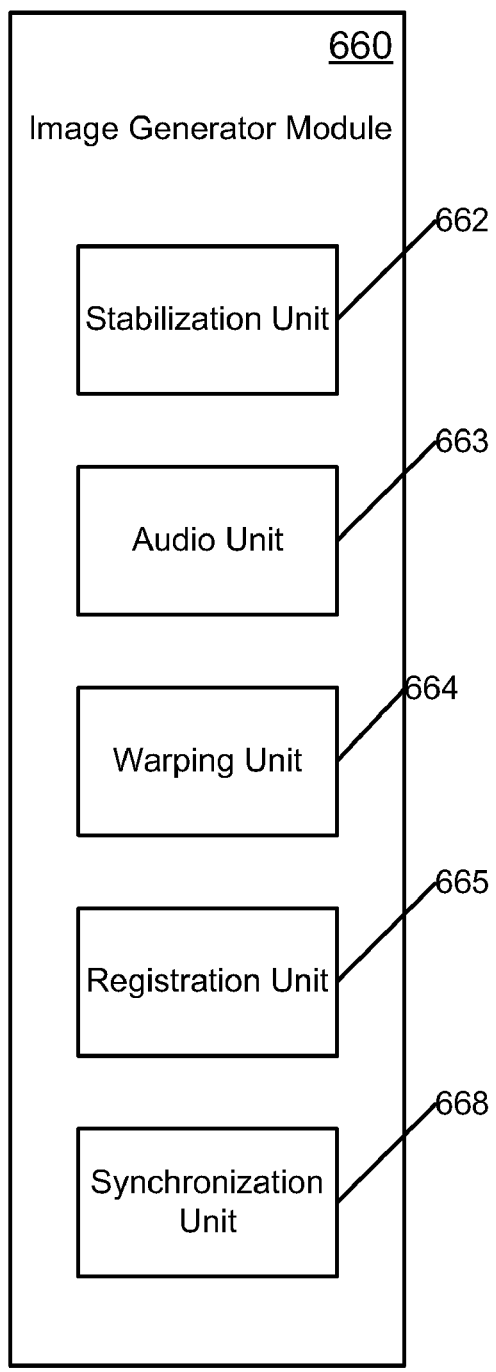
FIG. 6B is a functional block diagram depicting example unit sub-modules of an image generator module.

FIG. 6B is a functional block diagram depicting example units of an image generator module 660. Shown are a stabilization unit 662, a warping unit 664, a registration unit 665, a synchronization unit 668, and an audio unit 669.

The stabilization unit 662 uses alignment information to adjust the overlay images according to the relative orientation of the personal theater display 110 with respect to the viewable area 130. If the user 120 turns the head to one side, the overlay images are translated and/or rolled accordingly to maintain a stabilized orientation with the visual content displayed in the viewable area 130.

The audio unit 663 performs audio positioning as discussed in relation to FIG. 2. The source of a particular sound perceived by the user 120 can be adjusted according to the relative orientation of the personal theater display 110 with respect to the viewable area. If the user 120 turns the head to one side, the perceived source of an audio event can be translated accordingly.

The warping unit 664 uses alignment information to adjust the overlay images according to distortions in the view of the viewable area 130, typically due to the relative position of the personal theater display 110 with respect to the viewable area 130. If the user 120 is positioned to one side of a movie screen 150, as shown in FIG. 1B for example, then the view to the user 120 will be subject to a horizontal keystoning effect. Similarly, if the user 120 is seated in a front row, forcing an upward view of the movie screen 150, the user's view will further be subject to a vertical keystoning effect. For the overlay images to be perceived as properly integrated with the visual content displayed on the screen 150, the overlay images must be appropriately warped to accommodate the keystoning effects. The warping unit 664 therefore makes the necessary adjustments according to the orientation information derived from a captured view of markers 140, 142, 144, 146, or marker rows and columns 160, 162, 164, 166, for example.

The registration unit 665 aligns the overlay image with the visual content displayed in the viewable area 130 onto a 2-D display, such as the internal display 540 shown in FIG. 5. In one implementation, the overlay images are superimposed on the view of the visual content such that the overlay images are perceived as being in the foreground of the view, where the visual content is perceived in the background. For example, the scene being viewed might be from a perspective of a person lying flat on a field of grass, looking toward the horizon. Overlay images consisting of leaves of grass, for instance, are registered and displayed in the personal theater display 110 such that they are perceived by the user 120 as being in the foreground, while a distant tree is displayed with the visual content in the viewable area 130. The user 120 translates his or her head to the left and up to peek around the blades of grass. The "near field" blades of grass are then generated and warped according to the current orientation of the personal theater display with respect to the viewable area 130 and any keystone effects. The images of the blades of grass will then be displayed in the personal theater display 110 as moving to the right and down, allowing the user 120 the desired view of the distant tree.

As discussed above, alignment information includes timing information, which is used to synchronize the overlay images with the visual content displayed in the viewable area 130. The synchronization unit 668 performs this task. In one implementation, the timing information is received as part of the visual content. For example, the timing information can be encoded in an imperceptible barcode embedded in specific frames of the visual content. In another implementation, the timing information can be encoded in patterns of ON/OFF states and/or pulses in marker rows and columns 160, 162, 164, 166.

It will be appreciated that the grouping of functions within the modules and blocks described in relation to FIGS. 6A and 6B is for ease of description. Specific functions or steps can be moved from one module or block to another without departing from embodiments of the invention.

Figure 7:
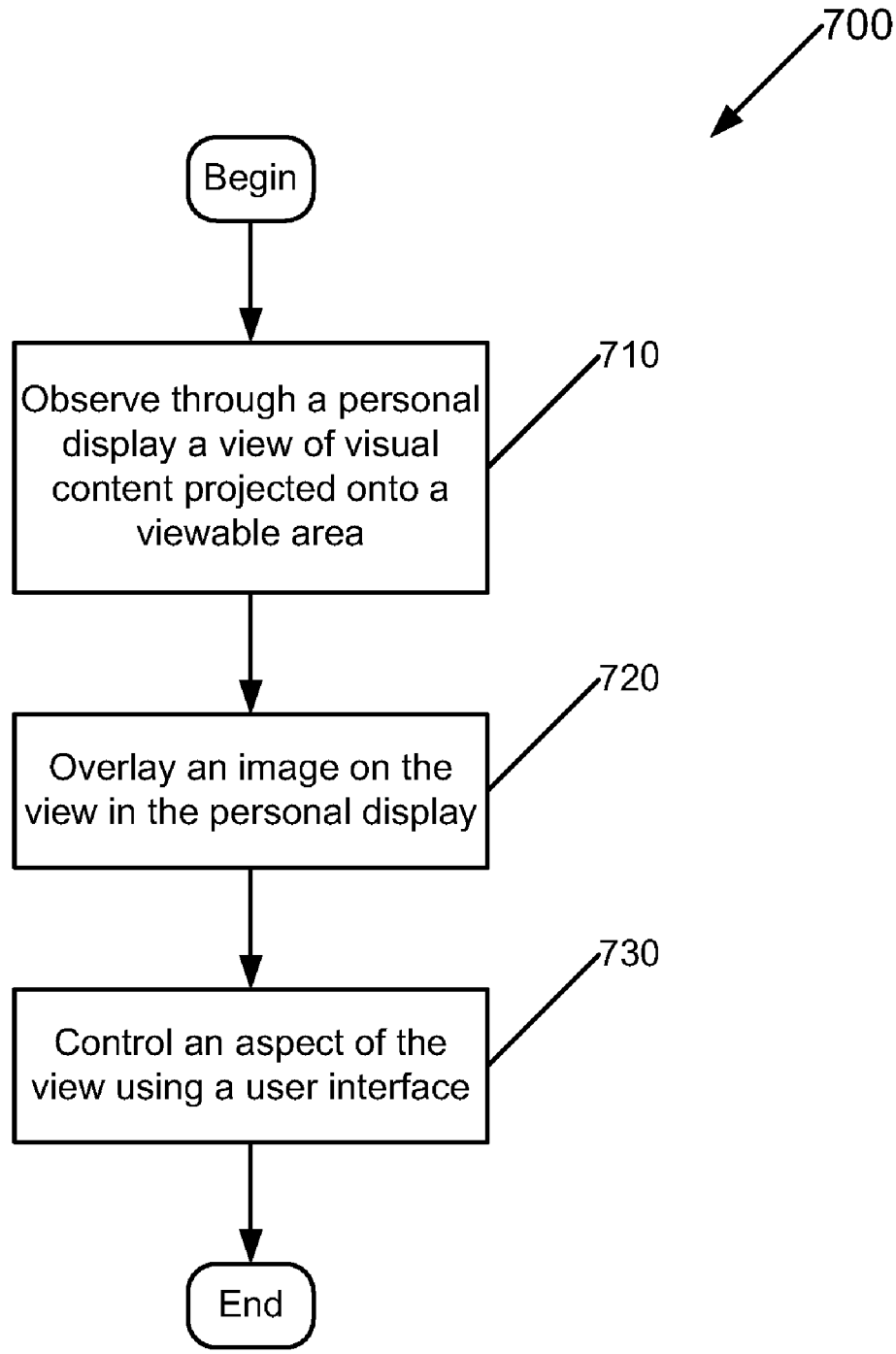
FIG. 7 is a flowchart depicting a method of interacting with projected visual content.

FIG. 7 is a flowchart depicting a method 700 of interacting with visual content displayed on a viewable area such as a movie screen. The method depicted can be implemented using the systems described above.

At 710, and in reference to FIG. 1A, a user 120 observes a view of visual content displayed on a viewable area 130 through a personal theater display 110 usually placed in front of the user's 120 eyes. As mentioned, the viewable area 130 can be a movie screen, or it can be any other device for displaying visual content. The visual content may include movies and rendered graphics, including video games. An overlay image is superimposed on the view in the personal display 110, at 720. The overlay image is typically generated and transmitted by an external device. The overlay image is stabilized with respect to the personal theater display 110 worn by the user 120, thereby accounting for any movement of the user's 120 head, for example. The overlay image is also registered with the observed visual content, thereby ensuring the desired perception of the overlay image as being integrated with the visual content. The overlay images are also synchronized with the visual content. Stabilization, registration, and synchronization are described in more detail in relation to FIG. 8.

At 730, the user 120 uses an interface to control an aspect of the combined view, which includes the view of the visual content and any overlay images. In this way, the user 120 may interact with elements of the visual content. In one implementation, the user controls a cursor visible in the view observed using the personal theater display 110. The user 120 can then use a joystick/button combination 240, as depicted in FIG. 2, to position the cursor on a displayed object of interest in the view. Pushing the button then generates a predetermined response, such as displaying information relevant to the object of interest. For example, in an automotive chase scene of a movie, the user 120 may wish to learn the make of car driven by one of the characters. Selecting the car with the cursor and activating the button causes information regarding the make and model of the car to appear, optionally with added information of interest. The user 120 may similarly obtain biographical information about an actor by selecting the actor in the view. In another example, the user 120 may be offered an opportunity to "vote" on some attribute of a story or character, or to determine the subsequent fate of the character. The character may be highlighted with overlay images in such a way as to notify the user 120 that an interaction opportunity is available. The user 120 can then select the character with the cursor and respond accordingly. As another example, the user 120 can select a product shown in the visual content and initiate a transaction to purchase it using pre-arranged account information. These examples are not limiting, and it will be appreciated that many other such interactions and/or transactions are possible using implementations of the present invention.

As discussed in relation to FIG. 1C, a cursor can be used by a user 120 to select visible calibration markers 172, 174, 176, 178, 180, 182 to facilitate manual calibration of the personal theater display 110.

In another implementation, the user 120 can control multiple cursors using an appropriate user interface (not shown). For example, up to ten fingertips could be used to control one or more multi-axis cursors.

In yet another implementation, a cursor-like identifier can be automatically generated by the personal theater display 110 to select elements of visual content and overlay images. Referring again to FIG. 1C, an avatar 190 associated with a user 120 can be identified with a highlighter 198 to discriminate the avatar 190 from a field containing all avatars 190, 192, 194, 196. Thus, using the highlighter 198, the user 120 may keep track of the avatar 190 during a game in which the avatars 190, 192, 194, 196 are in frequent and confusing high speed motion. The highlighter 198 can be superimposed as needed or be left on continuously.

Figure 8:
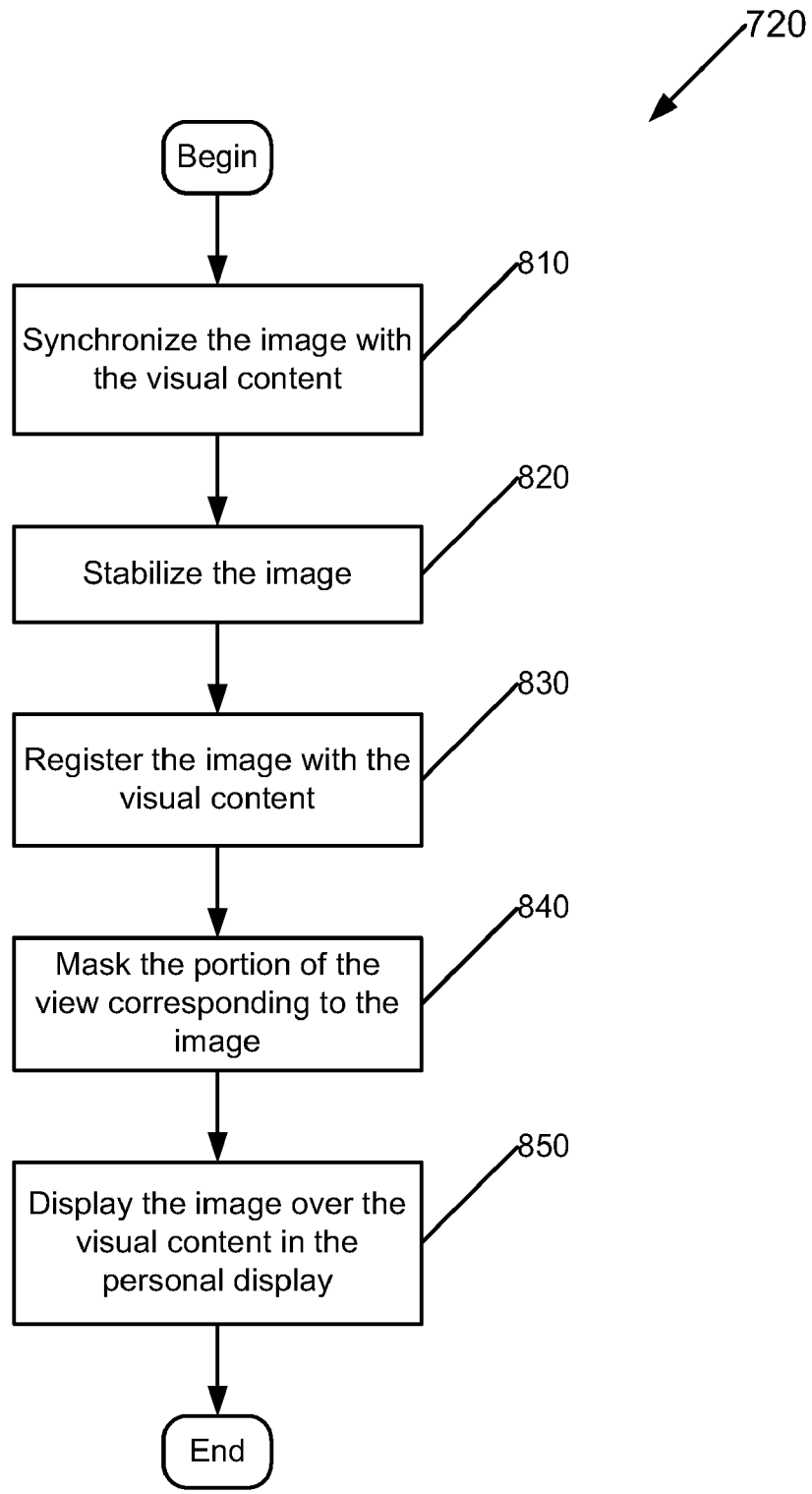
FIG. 8 is a flowchart depicting a method of overlaying a generated image using a personal theater display.

FIG. 8 is a flowchart depicting a method 720 of superimposing a generated overlay image on visual content viewed through a personal theater display 110, in reference to FIG. 1A.

The generated overlay image is synchronized with the visual content at 810. In one implementation, timing information is displayed on the viewable area 130 along with the visual content. As discussed above, the timing information can be displayed as a bar code placed imperceptibly within or between specified frames of the visual content. The bar code image is therefore captured optically in addition to the visual content. The captured content is processed (e.g., filtered) to extract the bar code, from which the timing information is further derived. The timing information is then used to synchronize the display of the overlay images superimposed over the visual content. For example, a time stamp that is associated with a particular frame of the visual content is extracted from the visual content as described. The appropriate overlay image is then selected for synchronous superimposition with the frame. It will be appreciated that system latencies affecting synchronization can be estimated and accommodated.

The use of a barcode is one example method for communicating timing information to a personal theater display. It will be appreciated that other equally viable methods of encoding an imperceptible timestamp in the visual content also exist. For example, a timestamp may be communicated using an alphanumeric value, or virtually any graphical, pictorial, or symbolic pattern configurable to include decodable timing information.

Stabilization is performed at 820 to accommodate movements of the personal theater display 110 positioned in front of the eyes of the user 120, as shown in FIG. 1A. Stabilization information, transmitted via light emitted by markers 140, 142, 144, 146, is present in the view captured optically through the personal theater display 110. In one implementation, the markers 140, 142, 144, 146 are positioned in a predetermined fixed spatial pattern from which the relative orientation of the personal theater display 110 can be estimated. Overlay images displayed within the personal theater display 110 can then be rotated, for example, to accommodate a roll in the user's view induced by a head movement, thus stabilizing and orienting the images with the visual content displayed on the fixed viewable area 130.

At 830, the overlay images are registered with the observed visual content. In one implementation, the markers 140, 142, 144, 146 function as anchor points defining a coordinate grid on the viewable area 130 for positioning (i.e., registering) the images for superimposition over the visual content at a particular x-y position. In another implementation, the overlay images are registered to induce a perception by the user 120 that it is positioned in a virtual foreground with respect to the visual content, which is perceived in the background. The overlay image registered as described above may represent an object blocking the view to the user 120 of another object of interest in the background. The user 120 can then shift the position of his or her head to one side in a natural movement to look around the perceived foreground object. The movement is tracked by the personal theater display 110, and a motion parallax effect is imposed on the overlay images, causing it to move to one side as if the user 120 were looking around it. Generally, the viewpoint of the user 120 through the personal theater display 110 of the visual content is the same regardless of where the user 120 is located with respect to the viewable area 130 (e.g., where the user 120 is sitting in the movie theater). The motion parallax effect is responsive to relatively small translations of the user's 120 head, and can be implemented as a fine adjustment in position. It is also possible to provide a unique viewpoint through the personal theater display 110 of the visual content that varies according to the user's 120 location, in addition to providing the motion parallax effect as discussed.

As discussed above in relation to FIG. 2, the personal theater display 110 can include audio transducers such as earpieces, for example. In one implementation, audio positioning is performed similarly to positioning of overlay images in the user's 120 view in the personal theater display 110. Information used by the personal theater display 110 to track movements of the user's 120 head is used to shift the perceived source of sounds heard in the audio transducers. In an example, an audio overlay sound is presented at the headset as coming primarily from the left of the user 120. When the user's 120 head is turned to the right, the sound is processed so that the sound is perceived as having shifted to the left. The resulting effect is that the sound is perceived as emanating from a position behind the user 120.

The markers 140, 142, 144, 146 can also be configured as uniquely self-identifying. This can simplify stabilization and registration because the relative orientation of the personal theater display 110 to the viewable area 130 is more easily determinable when the markers 140, 142, 144, 146 can be readily discriminated. For example, referring again to FIG. 1A, a marker 140 at the upper-left corner of a viewable area 130 can be configured to pulse at a predetermined frequency. The pulsed signal can then be identified as coming from the particular marker 140, and the overlay images can be stabilized against it as representing the upper-left corner of the screen 130. The other markers 142, 144, 146 can be configured similarly for self-identification.

At 840, portions of the view corresponding to the area in the view over which overlay images will be superimposed are masked. By masking that corresponding area, the superimposed images achieves optimal visibility. The overlay images can otherwise appear translucent, detracting from the visual experience desired for the user. In one implementation, when pixels of the internal display 540 (see FIG. 5) are activated in the course of displaying the overlay image, corresponding pixels in the pixel shutter 560 are closed to block that particular portion of the received view of the visual content. However, in another implementation, it may be desirable to have the overlay images appear translucent. In this implementation, masking is not performed.

The synchronized, stabilized, registered overlay image is superimposed over the visual content in the personal theater display 110 at 850.

Various implementations may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various implementations may also be implemented using a combination of both hardware and software.

Furthermore, those of skill in the art will appreciate that the various illustrative logical blocks, modules, data paths, and method steps described in connection with the above described figures and the implementations disclosed herein can often be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, connectors, data paths, circuits, and method steps described in connection with the implementations disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the implementations disclosed herein can often be implemented directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An example storage medium can be coupled to the processor such the processor can read information from, and write information to, the storage medium. In the alternative, the storage medium can be integral to the processor. The processor and the storage medium can also reside in an ASIC.

The above description of the disclosed implementations is provided to enable any person skilled in the art to make or use the invention. Various modifications to these implementations will be readily apparent to those skilled in the art, and the generic principles described herein can be applied to other implementations without departing from the spirit or scope of the invention. It is understood that the scope of the present invention fully encompasses other implementations that may become obvious to those skilled in the art and that the scope of the present invention is accordingly limited by nothing other than the appended claims.

What is claimed is:

1. A system for combining an overlay image with externally-displayed visual content, the system comprising:
   a tracking module to receive alignment information;
   an image generator module to generate said overlay image, and to align said overlay image using said alignment information; and
   a personal display module to superimpose said overlay image over a view of said externally-displayed visual content,
   wherein said alignment information provides relative orientation of the personal display module with respect to an area where the externally-displayed visual content is displayed.

2. The system of claim 1, further comprising
   a pixel masking module to mask a portion of said view of said externally-displayed visual content,
   wherein said portion corresponds to an area of said view over which said overlay image is superimposed.

3. The system of claim 1, wherein said externally-displayed visual content includes a movie.

4. The system of claim 1, wherein said externally-displayed visual content includes rendered graphics.

5. The system of claim 1, wherein said alignment information includes orientation information.

6. The system of claim 5, wherein said image generator module includes
   a stabilization unit to stabilize said overlay image using said orientation information.

7. The system of claim 5, wherein said image generator module includes
   an audio unit to position the perceived source of an audio emanation using said orientation information.

8. The system of claim 5, wherein said image generator module includes
   a warping unit to warp said overlay image using said orientation information.

9. The system of claim 5, wherein said image generator module includes
a registration unit to register said overlay image with said view of said externally-displayed visual content using said orientation information.

10. The system of claim 1, wherein said alignment information includes timing information.

11. The system of claim 10, wherein said image generator module includes
a synchronization unit to synchronize said overlay image with said externally-displayed visual content using said timing information.

12. The system of claim 1, further comprising
a user interface module to receive inputs to position said overlay image within said view of said externally-displayed visual content.

13. The system of claim 12, wherein said overlay image includes at least one cursor.

14. The system of claim 13, wherein said at least one cursor is a multi-axis cursor.

15. The system of claim 12, wherein said user interface module includes a joystick.

16. The system of claim 12, wherein said user interface module includes a trackpad.

17. The system of claim 12, wherein said user interface module includes a trackball.

18. The system of claim 12, wherein said user interface module includes a keypad.

19. A system for combining an overlay image with externally-displayed visual content, the system comprising:
a tracking module to receive alignment information:
an image generator module to generate said overlay image, and to align said overlay image using said alignment information; and
a personal display module to superimpose said overlay image over a view of said externally-displayed visual content,
wherein said alignment information is received from a plurality of external markers.

20. The system of claim 19, wherein said plurality of external markers includes light-emitting diodes.

21. The system of claim 19, wherein said plurality of external markers emit infra-red light.

22. The system of claim 19, wherein said plurality of external markers includes self-identifying markers.

23. The system of claim 19, wherein said plurality of external markers emit pulses of light.

24. The system of claim 23, wherein at least a portion of said alignment information is encoded in said pulses of light.

25. A method for combining an overlay image with externally-displayed visual content, comprising:
receiving alignment information;
aligning said overlay image using said alignment information, which provides relative orientation of said overlay image with respect to an area where the externally-displayed visual content is displayed; and
superimposing said overlay image over a view of said externally-displayed visual content.

26. The method of claim 25, wherein said alignment information includes orientation information.

27. The method of claim 26, wherein said aligning said overlay image includes
stabilizing said overlay image using said orientation information.

28. The method of claim 27, wherein said stabilizing said overlay image includes warping said overlay image to conform to a visual perspective of said view of said externally-displayed visual content.

29. The method of claim 27, further comprising
registering said overlay image with said view of said externally-displayed visual content using said orientation information.

30. The method of claim 29, wherein said registering includes placing said overlay image at a position in a virtual foreground with respect to said view of said externally-displayed visual content.

31. The method of claim 30, wherein said position varies with respect to said externally-displayed visual content according to a predetermined motion parallax.

32. The method of claim 29, further comprising
masking a portion of said view of said externally-displayed visual content,
wherein said portion corresponds to an area of said view over which said overlay image is superimposed.

33. The method of claim 25, wherein said alignment information includes timing information.

34. The method of claim 33, wherein said aligning said overlay image includes
synchronizing said overlay image with said externally-displayed visual content using said timing information included within said externally-displayed visual content.

35. A computer program, stored in a non-transitory tangible storage medium, for combining an overlay image with externally-displayed visual content, the program comprising executable instructions that cause a computer to:
receive alignment information;
align said overlay image using said alignment information, which provides relative orientation of said overlay image with respect to an area where the externally-displayed visual content is displayed; and
superimpose said overlay image over a view of said externally-displayed visual content.

36. An apparatus for combining an overlay image with externally-displayed visual content, comprising:
means for receiving alignment information;
means for aligning said overlay image using said alignment information, which provides relative orientation of said overlay image with respect to an area where the externally-displayed visual content is displayed; and
means for superimposing said overlay image over a view of said externally-displayed visual content.

* * * * *